United States Patent [19]

Sawada et al.

[11] Patent Number: 5,100,962
[45] Date of Patent: Mar. 31, 1992

[54] COATING COMPOSITION

[75] Inventors: Haruhiko Sawada, Neyagawa; Akimitsu Uenaka, Suita, both of Japan

[73] Assignee: Nippon Paint Co., Ltd., Osaka, Japan

[21] Appl. No.: 622,153

[22] Filed: Dec. 3, 1990

Related U.S. Application Data

[63] Continuation of Ser. No. 293,970, Jan. 6, 1989, abandoned, which is a continuation-in-part of Ser. No. 71,065, Jul. 8, 1987, abandoned.

[30] Foreign Application Priority Data

Jul. 9, 1986 [JP] Japan .................. 61-159669
Oct. 3, 1986 [JP] Japan .................. 61-234521
Mar. 18, 1987 [JP] Japan .................. 62-61138

[51] Int. Cl.$^5$ .................. C09D 127/12; C09D 133/14; C09D 161/28
[52] U.S. Cl. .................. 525/125; 525/155; 525/160; 525/199; 525/209; 525/69; 525/101; 525/931; 428/421; 428/447
[58] Field of Search .............. 525/124, 125, 155, 160, 525/199, 209, 931, 69, 101

[56] References Cited

U.S. PATENT DOCUMENTS

| | | | |
|---|---|---|---|
| 3,533,977 | 10/1970 | Read | 524/463 |
| 4,224,211 | 9/1980 | Kanazawa et al. | 525/101 |
| 4,288,357 | 9/1981 | Kanazawa et al. | 428/412 |
| 4,320,172 | 3/1982 | Takamizawa et al. | 525/101 |

FOREIGN PATENT DOCUMENTS

| | | |
|---|---|---|
| 57-34107 | 2/1982 | Japan . |
| 59-197471 | 11/1984 | Japan . |
| 61-46283 | 3/1986 | Japan . |
| 1171012 | 11/1969 | United Kingdom ............... 525/101 |
| 1227412 | 4/1971 | United Kingdom . |

OTHER PUBLICATIONS

Suk, "Solubility Parameters of Polymers from Turbimetric Titrations", J. of Applied Polymer Science, vol. 12, 2359-2370 (1968).

*Primary Examiner*—John C. Bleutge
*Assistant Examiner*—David Buttner
*Attorney, Agent, or Firm*—Wegner, Cantor, Mueller & Player

[57] ABSTRACT

A coating composition contains:
(i) a mixture of copolymers comprising (a) 20% to 80% by weight, in terms of the resin solid content, of at least one copolymer selected from the group consisting of silicon-containing copolymers and fluorine-containing copolymers comprising 40 to 60 mol % of fluoroolefin, 45 to 5 mol % of cyclohexylvinyl ether, 15 to 5 mol % of alkylvinyl ether, and 0 to 30 mol % of other comonomers, having an active hydrogen group and (b) 80% to 20% by weight, in terms of the resin solid content, of an acrylic copolymer resin having a solubility parameter greater by 0.5 to 1.5 than that of the copolymer (a) and having an active hydrogen group, and
(ii) a curing agent having a solubility parameter greater by 0.5 to 1.5 than that of the copolymer (a).

4 Claims, No Drawings

COATING COMPOSITION

CROSSREFERENCE TO RELATED APPLICATION

This application is a continuation of U.S. application Ser. No. 07/293,970 filed Jan. 6, 1989, now abandoned, which is a continuation-in-part of Ser. No. 07/071,065, filed July 8, 1987, abandoned.

BACKGROUND OF THE INVENTION

1. Field of the Invention

The present invention relates to a coating composition, more particularly to a coating composition which provides an exterior overcoating having an excellent weathering resistance, solvent resistance, and dirt resistance, and yet having a good appearance, undercoat adhesiveness, and recoating adhesiveness. The present invention also relates to a coating composition by which a coating having a deep tone can be formed by ensuring that the upper layer of the pigment dispersed system is a clear layer. Particularly, it relates to a coating composition which can impart a characteristic of the resin coating in a small amount to the resin of the clear layer which becomes the upper layer of the pigment dispersed system. These coating compositions can be used as final-coat paints for automobiles, paints for exteriors of buildings, and paints for metal substrates, etc.

2. Description of the Related Art

In the final-coating of automobiles, etc., or exterior coating of construction materials, etc., coatings having an excellent appearance and an excellent weathering resistance, solvent resistance, dirt resistance, etc., are required, but although top-coats such as acrylic resin paints, alkyl resin paints, polyester resin paints, conventionally used for general purpose work have an excellent coating appearance, they have a poor weathering resistance, solvent resistance, and dirt resistance, and an improvement of these properties is desired. Accordingly, various proposals have been made for solving such problems; for example, it has been proposed to coat a fluorine type resin on the top-coat, or to use a fluorine type resin as the resin for the top-coat. Japanese Unexamined Patent Publication (Kokai) No. 57-34107 (Japanese Patent Publication (Kokoku) No. 60-21686) discloses a fluorine-containing copolymer curable at a normal temperature. According to this publication, by using a copolymer containing a specific amount of fluoroolefin, cyclohexylvinyl ether, alkylvinyl ether, and hydroxyalkylvinyl ether as essential constituents, not only is the curability improved to a great extent, to enable curing within a short time by use of a known curing agent such as melamine, etc., but also a weathering-resistant coating having an enriched gloss and excellent solvent resistance, which is curable at a normal temperature by the use of isocyanate, can be obtained.

Also, Japanese Unexamined Patent Publication (Kokai) No. 59-197471 described a thermosetting resin composition for paint comprising a fluorine-containing copolymer. This publication disclosed that a solid color paint, metallic paint, clear paint, etc., having an excellent water resistance, solvent resistance, weathering resistance, etc., can be obtained by using a thermosetting resin composition for paint comprising a mixture of copolymers of a fluorine-containing copolymer containing a hydroxyl group and a copolymer comprising an alkyl ester of acrylic acid or methacrylic acid with other acrylic monomers, and a curing agent containing a functional group reactive with the hydroxyl group.

Further, Japanese Unexamined Patent Publication (Kokai) No. 61-46283 disclosed a paint composition containing a fluorine-containing copolymer. According to this publication, a coating having an excellent weathering resistance over a long term and an excellent appearance with a high gloss and good sharpness can be obtained by applying, as the final coating, a top clear paint comprising a polyol component comprising a fluorine-containing copolymer comprising fluoroolefin, cyclohexylvinyl ether, alkylvinyl ether, hydroxyalkylvinyl ether, and another copolymer polymerized at specific proportions, and an acrylic copolymer, and a polyhydric isocyanate compound or an aminoplast compound, on the base paint coating.

However, these coating compositions of the prior art contain a copolymer resin such as a fluorine-containing resin, and when a powder paint or water-dispersion paint is used, require baking at a high temperature have a poor coating appearance, and further, the solvent soluble type is very expensive and has a drawback in that the adhesiveness to the undercoat or recoating adhesiveness are poor.

Further, there was a problem in that the pigment-dispersed type top-coat of the prior art has unsatisfactory coating characteristics when the coating appearance is preferentially taken into account, and conversely, has an inferior appearance when the coating performance is preferentially taken into account. Accordingly, it has been very difficult in the prior art to satisfy both of these two antagonistic requirements.

As described above, attempts have been made in the prior art to coat a fluorine type resin on the exterior coating or formulate the resin in the top-coat paint, to improve the properties of an exterior top-coat, such as weathering resistance, solvent resistance, and dirt resistance, but problems still remain in that the appearance is bad, as mentioned above, and the adhesiveness to the undercoat or recoating adhesiveness are also bad. Conversely, if an attempt is made to improve the appearance of the coating, a problem arises in that coating properties such as weathering resistance, solvent resistance, and dirt resistance, etc., become unsatisfactory.

SUMMARY OF THE INVENTION

Accordingly, an object of the present invention is to provide a copolymer-containing coating composition which provides an exterior top coating having excellent coating properties such as weathering resistance, solvent resistance, and dirt resistance, and having a good appearance, adhesiveness to the substrate and recoating adhesiveness, by solving the problems of the prior art as described above.

Other objects and advantages of the present invention will be apparent from the following description.

In accordance with the first embodiment of the present invention, there is provided a coating composition which comprises:

(i) a mixture of copolymers comprising (a) 20% to 80% by weight, in terms of the resin solid content, of at least one copolymer selected from the group consisting of silicon-containing copolymers and fluorine-containing copolymers comprising 40 to 60 mol % of fluoroolefin, 45 to 5 mol % of cyclohexylvinyl ether, 15 to 5 mol % of alkylvinyl ether, and 0 to 30 mol % of other comonomers, having an active hydrogen group and b) 80% to 20% by weight, in terms of the resin solid content, of an acrylic copolymer resin having a solubility parameter greater by 0.5 to 1.5 than that of the copolymer (a) and having an active hydrogen group, and (ii) a curing agent having a solubility parameter greater by 0.5 to 1.5 than that of the copolymer (a).

The use of such a copolymer-containing coating composition can solve the above problems.

In accordance with the second embodiment of the present invention, there is also provided a coating composition which further contains, in addition to the above-mentioned essential constituents, a pigment dispersed in the above-mentioned acrylic copolymer resin.

DESCRIPTION OF THE PREFERRED EMBODIMENT

As described above, according to the present invention, by applying a coating of a formulation of a copolymer having an active hydrogen group with a specific acrylic copolymer resin on a conventional overcoating, the weathering resistance, solvent resistance, and dirt resistance, etc., of the cover-coat can be greatly improved, also, for example, the undercoat adhesiveness or recoating adhesiveness can be improved, without impairing the characteristics of the fluorine-containing copolymer and/or silicon-containing copolymer, and in addition, costs can be reduced without impairing the characteristics of the expensive fluorine-containing resin and/or silicon containing copolymer, thus also having a great economical effect.

The acrylic copolymer resin having an active hydrogen group and the curing agent to be used in the present invention are both essentially required to have specific solubility parameters as mentioned above, and the solubility parameter (i.e. SP value) $\delta sp$ is determined by the formula of K. W. SUH, J. M. CORBETT (Journal of Applied Polymer Science, 12, 2359, 1968) shown below.

$$\delta sp = \frac{\sqrt{Vml} \cdot \delta ml + \sqrt{Vmh} \cdot \delta mh}{\sqrt{Vml} + \sqrt{Vmh}} \text{ (cal/cm}^3\text{)}$$

wherein ml: low Sp solvent, mh: high Sp solvent, $\delta$: solubility parameter, V: molecular volume at turbidity point.

The $\delta sp$ value of the resin used herein is determined by vaporizing a solvent in the sample and then by redissolving 0.5 g of the resultant resin solid in 10 ml of dioxane, followed by measuring according to a turbidity titration method by using n-hexane and water.

Coating compositions comprising mixtures of copolymers having an active hydrogen group and acrylic copolymers have been known in the prior art, but all are products of a compromise by which the characteristics of the above copolymer are sacrificed to some extent, and it is presumed that the above copolymer is compatible with the acrylic resin, or no reference is made to compatibility. In contrast, the composition according to the present invention requires that the above copolymer should be incompatible to some extent with the acrylic resin, and this is defined by the solubility parameters as specified above. That is, in the present invention, the solubility parameters of the acrylic resin and the curing agent must be values greater by 0.5 or more, relative to the solubility parameter value of the above copolymer.

The coating obtained from a mixture of resins incompatible with each other or a mixture of resins which are incompatible to some extent, as mentioned above, tends to separate into two layers during setting or baking, because it is per se incompatible. At that time, the resin component with a smaller surface energy is liable to be oriented, i.e., floating at the top portion of the coating film, on the coating surface. Since the solubility parameter value and the surface energy have a parallel relationship, the copolymer component with the lower solubility parameter value is liable to be oriented on the coating surface, whereby the surface has the characteristics of the above copolymer, but conversely, the lower portion of the coating has the characteristics of the acrylic resin. Further, when a pigment is dispersed in the acrylic resin, the resin component containing the pigment with a greater solubility parameter value is oriented in the lower layer of the coating, but conversely, a clear layer with a greater solubility parameter value is liable to be oriented on the upper portion of the coating. Because a clear layer is formed at the upper portion, the coating thus obtained becomes a coating with a deep tone, and further, the characteristics of the clear layer resin can be imparted to the coating surface. For example, if a fluorine resin and/or a silicon resin is formed in the clear layer, only a small amount of the expensive fluorine resin and/or silicon resin having the weathering resistance, solvent resistance and dirt resistance functions of the fluorine resin and/or silicon resin need be used, whereby costs are reduced to a great extent compared with a coating of the fluorine resin alone, although having the same functions. There are no reports in the prior art that a two layer separation can be achieved by adjusting the compatibility of two or more of resins in a liquid composition, i.e., a resin suitable for dispersing the pigments therein and a resin essential to effect the desired characteristics or an additional resin used in combination with the base resin.

As the difference in the solubility parameter value of the acrylic copolymer resin and the curing resin relative to the above copolymer having an active hydrogen such as a hydroxyl group, carboxylic group, etc., is smaller than 0.5, the compatibility of these acrylic copolymer resin and curing agent is good, whereby the surface orientation effect of the copolymer as mentioned above cannot be exhibited. On the other hand, when the solubility parameter of the acrylic copolymer resin and the curing agent exhibits a value smaller than that of the above copolymer, the surface orientation tendency of the acrylic resin is reversed, whereby the characteristics of the above copolymer cannot be made available. The solubility parameter value of the acrylic copolymer and the curing agent desirably should be greater by 0.5 or more, preferably 0.5 to 1.5, than the Sp value of the fluorine-containing copolymer and the silicon-containing resin.

The content of the copolymer having the above active hydrogen group in the copolymer mixture in the coating composition according to the present invention is 10% to 90% by weight. When the above-mentioned copolymer is less than 10% by weight, the characteristics of the copolymer cannot be made fully available, and conversely, if in excess of 90% by weight, the adhesiveness to the substrate is poor, the costs are higher, and the shielding characteristic is undesirably degraded. The content of the above-mentioned copolymer is preferably within the range of 20% to 80% by weight.

As the copolymer having the active hydrogen group according to the present invention, for example, there may be included copolymers having one or more bonds such as —OH, —COOH, —NH$_2$, >NH, —SH, —SiOH, —SiH, etc., such as fluorine resin, silicon resin, acrylic resin, polyester resin, alkyl resin, etc., particularly preferably fluorine resin or silicon resin. The fluorine resin may be preferably a fluorine containing copolymer comprising 40 to 60 mol % of fluoroolefin, 45 to 5 mol % of cyclohexylvinyl ether, 15 to 5 mol % of alkylvinyl ether and 0 to 30 mol % of other comonomers. Of the above fluorine copolymers, as disclosed in Japanese Patent Publication (Kokoku) No.60-21686 as mentioned above, those with too low a content of fluoroolefin are not preferable with respect to weathering resistance, and those with too high a fluoroolefin content tend to be disadvantageous from the aspects of manufacturing costs. Also, those with too low a content of cyclohexylvinyl ether tend to have an undesirably lowered hardness in the coating, and those with too low a content of alkylvinyl ether tend to have an undesirably lowered flexibility. Also, it is particularly important to contain hydroxyalkylvinyl ether at a proportion within the range as specified above, to improve the curability without impairing the various useful characteristics thereof as the paint. More specifically, a fluorine copolymer with too high a content of hydroxyalkylvinyl ether not only has a lowered solubility of the copolymer in organic solvents, but also a lowered flexibility of the coating, and conversely, if the content is too low, the durability and adhesiveness of the coating tend to be undesirably lowered. As the fluoroolefin, perhaloolefins, particularly chlorotrifluoroethylene or tetrafluoroethylene, are preferred. As the alkylvinyl ether, those having straight or branched alkyl group of 2 to 8 carbon atoms, particularly with alkyl groups having 2 to 4 carbon atoms, are preferred.

The above fluorine-containing copolymer can also contain comonomers other than the four kinds of essential constituents as mentioned above, within the range which does not exceed 30 mol %. As such comonomers, ethylene, propylene, isobutylene, vinyl chloride, vinylidene chloride, methyl methacrylate, butyl acetate, etc., may be included.

The above fluorine-containing copolymer can be produced according to conventional methods by carrying out a copolymerization reaction by permitting a polymerization initiator (e.g., peroxide compound such as benzoyl peroxide, etc., and azo type compound such as azobisisobutylonitrile, etc.) to act on a monomeric mixture at predetermined proportions in the co-presence of a polymerization medium (e.g., aromatic hydrocarbon such as xylene, toluene, etc., and ester type, ether type organic solvent). The copolymerization reaction temperature is not particularly limited, but it is necessary to maintain a general temperature sufficient for cleavage of the polymerization initiator.

As the silicon resin to be used in the present invention, any resin-containing silicon element in the resin can be used, and is generally an organopolysiloxane, a copolymer having a structure of:

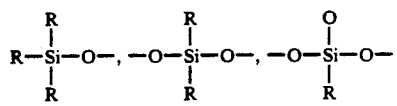

(wherein R is C$_{1-3}$ alkyl group or phenyl group) introduced into the resin structure. To obtain such a copolymer, it is possible to use the method in which an organopolysiloxane is mixed into a copolymer containing no silicon element, and then a condensation reaction is conducted in the presence of heat or a catalyst. Alternatively, the method in which an organopolysiloxane is reacted with a vinyl monomer having active hydrogen such as acrylic acid, methacrylic acid, etc., to prepare a vinyl monomer containing silicon, and then another vinyl monomer is copolymerized therewith, can be used.

The acrylic copolymer resin having the active hydrogen group to be used in the present invention can be obtained by copolymerization of various ethylenic monomers according to conventional methods. Examples of such ethylenic monomers may include aromatic vinyl monomers such as styrene, α-methylstyrene, o-methylstyrene, m-methylstyrene, p-methylstyrene, p-tertbutylstyrene, benzyl acrylate, benzyl methacrylate, etc.; acrylic acid or methacrylic acid esters (methyl acrylate, ethyl acrylate, isopropyl acrylate, n-propyl acrylate, n-butyl acrylate, isobutyl acrylate, methyl methacrylate, ethyl methacrylate, isopropyl methacrylate, n-propyl methacrylate, n-butyl methacrylate, isobutyl methacrylate, 2-ethylhexyl acrylate, n-octyl acrylate, dodecyl acrylate, lauryl acrylate, 2-ethylhexyl methacrylate, n-octyl methacrylate, dodecyl methacrylate, lauryl methacrylate, stearyl methacrylate, tridecyl methacrylate, addition reaction products of oil fatty acids with acrylic acid or methacrylic acid ester monomer having oxirane structure (e.g., addition reaction product of stearic acid with glycidyl methacrylate), itaconic acid ester such as addition reaction product of an oxirane compound having C$_8$ or more alkyl group with acrylic acid or methacrylic acid (dimethyl itaconate, etc.), maleic acid ester (dimethyl maleate, etc.), fumaric acid ester (methyl fumarate, etc.), acrylonitrile, methacrylonitrile, vinyl acetate and other ethylenic monomers. Examples of the ethylenic monomer having active hydrogen may include ethylenic monomers having hydroxyl group such as hydroxyethyl acrylate, hydroxypropyl acrylate, hydroxybutyl acrylate, hydroxymethyl methacrylate, hydroxyethyl methacrylate, hydroxypropyl methacrylate, hydroxybutyl methacrylate, N-methylolacrylamide, allyl alcohol, etc.; and ethylenic monomers having carboxylic group such as methacrylic acid, crotonic acid, ethacryl acid, propylacrylic acid, isopropylacrylic acid, itaconic acid, maleic anhydride fumaric acid, etc.

The acrylic copolymer resin can be obtained according to general methods, for example, by formulating the above various monomers at predetermined proportions, respectively, and polymerizing the mixture in a conventional manner. For example, a monomeric formulation is mixed with a known polymerization catalyst (e.g., azobisisobutylonitrile, benzoyl peroxide, etc.), and adding the mixture dropwise into a reaction vessel containing a solvent (e.g., xylene, toluene, mineral spirit, etc.) heated to a polymerizable temperature (e.g., 60° to 140° C.), followed by aging.

As the curing agent having an sp value greater by 0.5 or more than that of the above copolymer to be formulated in the coating composition of the present invention, for example, an alkyl etherated amino resin or an isocyanate type compound may be employed.

When an alkyl etherated amino resin is used as the curing agent, or when a copolymer mixture and an alkyl etherated amino resin are used as the curing agent, the ratio of the copolymer mixture and the alkyl etherated amino resin used is preferably 55/45 to 95/5, more preferably 60/40 to 80/20, based on weight. On the other hand, when an isocyanate type compound is used as the curing agent, the ratio of the copolymer and the isocyanate type compound used is preferably 0.3 to 1.5, more preferably 0.5 to 1.0, in terms of the molar ratio of the isocyanate group/hydroxyl group.

If the amount of the alkyl etherated amino resin used is more than the above range, a mutual reaction between the alkyl etherated amino resins is likely to occur, whereby the flexibility, etc., of the coating will be lowered, but conversely if the amount is too small, a satisfactory curability can not be obtained to give a low crosslinking density, whereby the weathering resistance, solvent resistance, and dirt resistance are undesirably lowered. As the alkyl etherated amino resin, for example, melamine resins, urea resins, benzoguanamine resin subjected to alkyl etheration such as methyl etheration, butyl etheration, isobutyl etheration, methyl butyl mixed etheration, etc., may be employed. Also, to accelerate the curing, an acid catalyst (e.g., sulfonic acid type catalyst such as p-toluene sulfonic acid, etc. can be added, if necessary.

On the other hand, if an isocyanate type compound is outside the above range, a large amount of isocyanate may remain in the coating, or it may react with moisture, etc., in the air to lower the weathering resistance, adhesiveness, etc. Conversely, if the amount is too small, the mechanical properties, chemical resistance, etc., of the coating are undesirably lowered. Examples of the isocyanate type compound may include polyisocyanate compounds, polyisocyanate compounds subjected to blocking, and examples of the polyisocyanate compound may include ethylene diisocyanate, propylene diisocyanate, tetramethylene diisocyanate hexamethylene diisocyanate, phenylene diisocyanate, isophorone diisocyanate, and the like. Also, as the polyisocyanate compound subjected to blocking, those obtained by blocking of the polyisocyanate compound as mentioned above with a blocking agent may be employed, and examples of the blocking agent may include phenol type, alcohol type, mercaptan type, oxime type, imine type compounds, etc.

As the pigment available in the second embodiment of the present invention, for example, inorganic tinting pigments such as titanium dioxide, zinc oxide, chrome yellow, etc., inorganic extender pigments such as barium sulfate, talc etc., organic pigments such as azo type, quinacridone type, perylene type, cyanine blue type, carbon black, etc., can be used. These pigments are formulated in a conventional manner generally in an amount of 1% to 50% by weight, preferably 5% to 50% by weight, in the case of an inorganic pigment, and 5% to about 20% by weight in the case of an organic pigment, in the above acrylic resin. Also, a flaky metal powder can be used in combination with the above pigment, or alone when dispersed in the acrylic copolymer resin for dispersion.

In the coating composition according to the present invention, in addition to the essential components as described above, any desired component generally formulated in paint compositions of the prior art can be included so long as the desired characteristics described above are not impaired. Such components may include organic solvents such as aliphatic, alicyclic, aromatic hydrocarbons, esters, ethers, ketones, alcohols, (generally 1% to 90% by weight), etc., and further, other conventional additives can be formulated.

EXAMPLES

In the following, the present invention is described in more detail by referring to Examples, which in no way limit the scope of the present invention. In the following Examples, "%" and "parts" indicate "% by weight" and "parts by weight", unless otherwise specified.

EXAMPLES 1-4 AND COMPARATIVE EXAMPLES

Preparation of Formulated Components (1) Preparation of Fluorine-Containing Copolymer (A)

A 50% xylene solution of a fluorine-containing copolymer (Lumiflon LF-200, produced by Asahi Glass K.K.) was prepared. This fluorine-containing copolymer had a hydroxyl value of 52 (mgKOH/g) and a solubility parameter value of 9.8 (hereinafter called fluorine-containing copolymer A).

(2) Preparation of Silicon-Containing Copolymer (B)

A solvent mixture of 90 parts of xylene and 10 parts of MIBK was heated to 105° C., and to this mixture was added a mixture of 10 parts of a silicon-containing monomer having a structure of the formula:

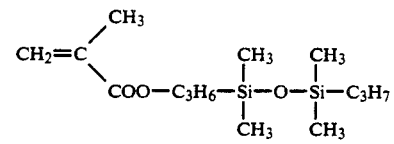

16.9 parts of styrene, 7.3 parts of methyl methacrylate, 46.5 parts of ethylhexyl methacrylate, 16.2 parts of hydroxyethyl methacrylate and 3.1 parts of methacrylic acid, and 0.7 parts of azobisisobutylonitrile over 4 hours, and further, polymerization was carried out at the same temperature for 2 hours.

The silicon-containing copolymer obtained had a solubility parameter value of 9.8, a hydroxyl value of mgKOH/g, and an acid value of 20 mgKOH/g (hereinafter called silicon-containing copolymer B).

(3) Preparation of Acrylic Copolymer Resin (C-1–C-3)

The solvent with the composition shown in Table 1 was heated to 105° C., and the mixture comprising monomers with the composition and the polymerization initiator shown in Table 1 were added dropwise thereto over 4 hours, and further, polymerization was carried out at the same temperature for 2 hours.

TABLE 1

| Resin | C-1 | C-2 | C-3 |
|---|---|---|---|
| Composition: | | | |
| Solvent: | | | |
| Xylene | 90 | 90 | 90 |
| MIBK | 10 | 10 | 10 |
| Monomer: | | | |
| Styrene | — | — | 16.9 |
| Ethyl acrylate | 31.0 | 8.6 | — |
| Methyl methacrylate | 29.5 | 25.3 | 7.3 |
| Ethylhexyl methacrylate | 20.2 | 46.8 | 56.5 |
| Hydroxyethyl methacrylate | 16.2 | 16.2 | 16.2 |
| Methacrylic acid | 3.1 | 3.1 | 3.1 |
| Polymerization initiator (Azobisisobutylonitrile) | 0.7 | 0.7 | 0.7 |
| Solubility parameter value | 11.0 | 10.5 | 10.0 |
| Hydroxyl value (mgKOH/g) | 70 | 70 | 70 |

TABLE 1-continued

| Resin | C-1 | C-2 | C-3 |
|---|---|---|---|
| Acid value (mgKOH/g) | 20 | 20 | 20 |

(4) Curing Agent

D-1 Sumidule N-75, produced by Sumitomo Bayer Urethane Co. (urethane type curing agent, solids 75%)

D-2 Cymel 1130-254J, produced by Mitsui Cyanamide Co. (methyl butyl mixed etherated melamine resin, solids 80%)

D-3 Uvan 20N-60, produced by Mitsui Toatsu Co. (butyl etherated melamine resin, solids 60%)

The curing agents D-1, D-2 and D-3 had solubility parameter values of 11.0, 11.3 and 10.1, respectively.

(5) Preparation of Coating Materials

Coating materials were prepared by mixing with the compositions, shown in varnish ratio, in Table 2.

TABLE 2

| Component | Example 1 | 2 | 3 | 4 | Comparative Example 1 | 2 | 3 | 4 | 5 | 6 |
|---|---|---|---|---|---|---|---|---|---|---|
| A | 39 | 39 | 39 | 39 | 39 | 39 | 78 | — | — | — |
| C-1 | 39 | — | 39 | — | 39 | — | — | 78 | — | — |
| C-2 | — | 39 | — | 39 | — | — | — | — | 78 | — |
| C-3 | — | — | — | — | — | 39 | — | — | — | 78 |
| D-1 | 6.9 | 6.9 | — | — | — | 17.7 | 17.7 | 17.7 | 17.7 | 17.7 |
| D-2 | — | — | 12.3 | 12.3 | — | — | — | — | — | — |
| D-3 | — | — | — | — | 16.3 | — | — | — | — | — |
| Solvesso 100 | 7.0 | 7.0 | 5.0 | 5.0 | 7.0 | 7.0 | 7.0 | 7.0 | 7.0 | 7.0 |
| Solvesso 150 | — | — | 5.0 | 5.0 | — | — | — | — | — | — |
| Xylene | 3.0 | 3.0 | — | — | 3.0 | 3.0 | 3.0 | 3.0 | 3.0 | 3.0 |

(Note): Solvesso 100 and Solvesso 150: Aromatic hydrocarbon solvents produced by Exxon Chemical

Preparation of Coatings

On a substrate of a dull steel plate chemically treated with zinc phosphate of 0.8×90×300 mm, which was further subjected to cationic electrodeposition (Power Coat U-500, produced by Nippon Paint Co.), an intercoating (Orga OP-2 Gray, produced by Nippon Paint Co.) and a top-coating (Orga G-65 White, produced by Nippon Paint K.K.), a clear coating material adjusted to a viscosity of 20 seconds by #4 Ford Cup with a solvent mixed at a ratio of Solvesso 100: xylene: and Solvesso 150 of 5:3:2, was applied to a film thickness of 30 μm, was then allowed to set at room temperature for 7 minutes, and was baked at 140° C. for 30 minutes to prepare a test piece.

Coating Performance Tests

The following evaluation tests of the coatings obtained above were conducted respectively.

(1) Adhesiveness 100 checkered pieces were cut on the test strip, in accordance with JIS-K-5400 6.15, and after a commercially available Cellophane tape was pressure adhered thereon, the tape was at once peeled off and the checkered pieces remaining on the test strip after peeling were counted to confirm the adhesiveness between the overcoating and the clear coating.

(2) Recoating Adhesiveness

On the coating as prepared above, a clear coating material adjusted to a similar viscosity was applied, and again baked at 140° C. for 30 minutes. The test piece was tested according to the method of (1) to confirm adhesiveness between the clear coating and the clear coating.

(3) Contact Angle

The coating as prepared above was subjected to measurement of the contact angle with water by use of FACE contact angle form produced by Kyowa Kaimen Kagaku Co.

(4) Weathering Resistance Test

A natural exposure for 2 years was carried out in Okinawa, and the gloss of the coating (60° gloss) was measured.

The results were as shown in Table 3.

TABLE 3

| | Example 1 | 2 | 3 | 4 | Comparative Example 1 | 2 | 3 | 4 | 5 | 6 |
|---|---|---|---|---|---|---|---|---|---|---|
| Fluorine resin | A | A | A | A | A | A | A | — | — | — |
| Acrylic resin | C-1 | C-2 | C-1 | C-2 | C-1 | C-3 | — | C-1 | C-2 | C-3 |
| Curing agent | D-1 | D-1 | D-2 | D-2 | D-3 | D-1 | D-1 | D-1 | D-1 | D-1 |
| Adhesiveness | 100/100 | 100/100 | 100/100 | 100/100 | 100/100 | 100/100 | 50/100 | 100/100 | 100/100 | 100/100 |
| Recoating adhesiveness | 100/100 | 100/100 | 100/100 | 100/100 | 100/100 | 100/100 | 0/100 | 100/100 | 100/100 | 100/100 |
| Contact angle | 90.0 | 90 | 91 | 90 | 78 | 87 | 91 | 74 | 76 | 78 |
| Weathering resistance 60° C. gloss retention after 2 years exposure in Okinawa | 99 | 101 | 98 | 96 | 92 | 90 | 98 | 83 | 85 | 85 |

EXAMPLES 5-8 AND COMPARATIVE EXAMPLES 7-8

Coating compositions with the compositions shown in Table 4 were prepared as described in Examples 1-4 and Comparative Examples 1-6, and their performance were evaluated.

The results were as shown in Table 4.

TABLE 4

|  | Example | | | | Comparative Example | |
|---|---|---|---|---|---|---|
|  | 5 | 6 | 7 | 8 | 7 | 8 |
| Fluorine resin | A/74 | A/62.4 | A/15.6 | A/3.9 | A/75.7 | A/2.3 |
| Acrylic resin | C-1/3.9 | C-1/15.6 | C-1/62.4 | C-1/74.1 | C-1/2.3 | C-1/75.7 |
| Curing agent | D-1/17.7 | D-1/17.7 | D-1/17.7 | D-1/17.7 | D-1/17.7 | D-1/17.7 |
| Adhesiveness | 100/100 | 100/100 | 100/100 | 100/100 | 70/100 | 100/100 |
| Recoating adhesiveness | 100/100 | 100/100 | 100/100 | 100/100 | 50/100 | 100/100 |
| Contact angle | 91 | 90 | 90 | 89 | 91 | 80 |
| Weathering resistance | 100 | 100 | 98 | 94 | 100 | 87 |

EXAMPLES 10-11 AND COMPARATIVE EXAMPLES 9-10

As shown in the formulations of Table 5, 39 parts of the acrylic resin and 40 parts of titanium dioxide were premixed according to a conventional method, and subsequently dispersed by a sand grind mill (hereinafter called SG mill), followed by mixing the remaining resins as a dissolution resin, curing agent, and xylene, to prepare white coating materials.

TABLE 5

|  | Example | | Comparative Example | |
|---|---|---|---|---|
|  | 10 | 11 | 9 | 10 |
| Fluorine resin | A/39 | A/39 | A/39 | — |
| Acrylic resin | C-1/39 | C-1/39 | C-3/39 | C-1/78 |
| Curing agent | D-1/17.2 | D-2/12.3 | D-1/17/7 | D-1/17.7 |
| Titanium dioxide | 40 | 40 | 40 | 40 |
| Xylene | 10 | 10 | 10 | 10 |

On a substrate of a dull steel plate chemically treated with zinc phosphate, which was further subjected to cationic electrodeposition (Power Coat V-500, produced by Nippon Paint Corp.), an intercoating (Orga OP-2 Gray, produced by Nippon Paint Corp.), the above white coating material adjusted to a viscosity of 20 seconds by #4 Ford Cup with a solvent at a ratio of Solvesso 100/xylene=5/5, was applied to a film thickness of 40 μm, was then allowed to set at room temperature for 7 minutes, and was baked at 140° C. for 30-minutes to prepare a test piece.

The performances of the coatings obtained were as shown in Table 6.

TABLE 6

|  | Example | | Comparative Example | |
|---|---|---|---|---|
|  | 10 | 11 | 9 | 10 |
| Finished appearance | o | o | x | o |
| Adhesiveness | 100/100 | 100/100 | 100/100 | 100/100 |
| Recoating adhesiveness | 100/100 | 100/100 | 100/100 | 100/100 |
| Contact angle | 90 | 90 | 84 | 74 |
| Weathering resistance 60° gloss retention after 2 years exposure in Okinawa | 92 | 87 | 72 | 42 |

EXAMPLES 12-15 AND COMPARATIVE EXAMPLES 11-16

As shown in the formulations of Table 7, 39 parts of the resin C-1, C-2, or C-3 (39 parts of the resin A in the case of Comparative Example 13) and 45 parts of the component E-1 were premixed according to a conventional method, then dispersed by a paint shaker (produced by Red Devil Co.), and further mixed with the remaining resin components as a dissolution resin, the curing agent, and the solvents to prepare white coating materials.

On a substrate of a dull steel plate chemically treated with zinc phosphate of 0.8×90×300 mm which was further applied with a cationic electrodeposition, (Power Coat U-500, produced by Nippon Paint Co.) and an intercoating (Orga OP-2 Gray, produced by Nippon Paint), a clear coating material adjusted to a viscosity of 20 seconds by 4 Ford Cup with a solvent mixed at a ratio of Solvesso 100: xylene: and Solvesso 150 of 5:3:2 was applied to a film thickness of 30μ. After allowing to set at room temperature for 7 minutes, the coated steel substrate was baked at 140° C. for 30 minutes to prepare a test piece.

The evaluation of the coating obtained was conducted as in Example 1. The results were as shown in Table 7.

TABLE 7

| Component | Example | | | | Comparative Example | | | | | |
|---|---|---|---|---|---|---|---|---|---|---|
|  | 12 | 13 | 14 | 15 | 11 | 12 | 13 | 14 | 15 | 16 |
| A | 39 | 39 | 39 | 39 | 39 | 39 | 78 | — | — | — |
| C-1 | 39 | — | 39 | — | 39 | — | — | 78 | — | — |
| C-2 | — | 39 | — | 39 | — | — | — | — | 78 | — |
| C-3 | — | — | — | — | — | 39 | — | — | — | 78 |
| D-1 | 6.9 | 6.9 | — | — | — | 17.7 | 17.7 | 17.7 | 17.7 | 17.7 |
| D-2 | — | — | 12.3 | 12.3 | — | — | — | — | — | — |
| D-3 | — | — | — | — | 16.3 | — | — | — | — | — |
| E-1 | 45 | 45 | 45 | 45 | 45 | 45 | 45 | 45 | 45 | 45 |
| Solvesso 100 | 7.0 | 7.0 | 5.0 | 5.0 | 7.0 | 7.0 | 7.0 | 7.0 | 7.0 | 7.0 |
| Solvesso 150 | — | — | 5.0 | 5.0 | — | — | — | — | — | — |
| Xylene | 3.0 | 3.0 | — | — | 3.0 | 3.0 | 3.0 | 3.0 | 3.0 | 3.0 |
| Contact angle | 90 | 90 | 90 | 90 | 78 | 86 | 90 | 73 | 76 | 82 |
| Gloss retention after 2 years' exposure | 90 | 90 | 86 | 88 | 72 | 70 | 92 | 62 | 64 | 67 |

TABLE 7-continued

| | Example | | | | Comparative Example | | | | | |
|---|---|---|---|---|---|---|---|---|---|---|
| Component | 12 | 13 | 14 | 15 | 11 | 12 | 13 | 14 | 15 | 16 |
| in Okinawa | | | | | | | | | | |
| Finished appearance | o | o | o | o | Δ | Δ | x | x | x | x |

(Note 1): Component E-1 = Titanium dioxide
(Note 2): Solvesso 100 and Solvesso 150: Aromatic hydrocarbon solvents produced by Shell Petroleum

EXAMPLE 16–23 AND COMPARATIVE EXAMPLE 17–22

Coating materials with the composition shown in Table 8 were prepared as described in Examples 12–15 and Comparative Examples 11–16, and their performances were evaluated.

The results were as shown in Table 8.

COMPARATIVE EXAMPLES 25 AND 26

Coating compositions with the compositions shown in Table 10 were prepared in the same manner as mentioned above and their performances were evaluated. The results are shown in Table 10.

TABLE 8

| | Example | | | | | | | | Comparative Example | | | | | |
|---|---|---|---|---|---|---|---|---|---|---|---|---|---|---|
| Component | 16 | 17 | 18 | 19 | 20 | 21 | 22 | 23 | 17 | 18 | 19 | 20 | 21 | 22 |
| A | 39 | 39 | 39 | 39 | 39 | 39 | 39 | 39 | 39 | 39 | 78 | — | — | — |
| C-1 | 39 | 39 | 39 | 39 | 39 | — | 39 | — | 39 | — | — | 78 | — | — |
| C-2 | — | — | — | — | — | 39 | — | 39 | — | — | — | — | 78 | — |
| C-3 | — | — | — | — | — | — | — | — | — | 39 | — | — | — | 78 |
| D-1 | 6.9 | 6.9 | 6.9 | 6.9 | 6.9 | 6.9 | — | — | — | 17.7 | 17.7 | 17.7 | 17.7 | 17.7 |
| D-2 | — | — | — | — | — | — | 12.3 | 12.3 | — | — | — | — | — | — |
| D-3 | — | — | — | — | — | — | — | — | 16.3 | — | — | — | — | — |
| E-1* | 45 | — | — | — | — | 45 | 45 | 45 | 45 | 45 | 45 | 45 | 45 | 45 |
| E-2* | — | 11 | — | — | — | — | — | — | — | — | — | — | — | — |
| E-3* | — | — | 11 | — | — | — | — | — | — | — | — | — | — | — |
| E-4* | — | — | — | 11 | — | — | — | — | — | — | — | — | — | — |
| E-5* | — | — | — | — | 7.8 | — | — | — | — | — | — | — | — | — |
| Solvesso 100 | 7.0 | 7.0 | 7.0 | 5.0 | 7.0 | 7.0 | 5.0 | 5.0 | 7.0 | 7.0 | 7.0 | 7.0 | 7.0 | 7.0 |
| Solvesso 150 | — | — | — | — | — | — | 5.0 | 5.0 | — | — | — | — | — | — |
| Xylene | 3.0 | 3.0 | 3.0 | — | 3.0 | 3.0 | — | — | 3.0 | 3.0 | 3.0 | 3.0 | 3.0 | 3.0 |
| Contact angle | 90 | 90 | 90 | 90 | 90 | 90 | 88 | 87 | 76 | 72 | 91 | 74 | 76 | 76 |
| Gloss retention after 2 years' exposure in Okinawa | 95 | 90 | 94 | 90 | 92 | 94 | 90 | 90 | 86 | 90 | 98 | 83 | 84 | 81 |
| Finished appearance | o | o | o | o | o | o | o | o | o | o | x | Δ | Δ | Δ |

*Pigment
E-1 Titanium dioxide
E-2 Hostaperm yellow H3G, produced by Hoechst Co. (azo type)
E-3 Sinquasia Red YRT759D, produced by Du Pont Co. (quinacridone type)
E-4 Pariogen Red L3910D, produced by BASF Co. (perilene type)
E-5 Alpaste 7610N, produced by Toyo Aluminum Co.

EXAMPLES 24 AND 25 AND COMPARATIVE EXAMPLE 23 AND 24

The coating materials with the compositions shown in Table 9 were prepared as described in Examples 16–23 and Comparative Examples 17–22, and their performances were evaluated.

The results were as shown in Table 9.

TABLE 9

| | Example | | Comparative Example | |
|---|---|---|---|---|
| | 24 | 25 | 23 | 24 |
| A | — | 19.5 | — | — |
| B | 39 | 19.5 | 78 | — |
| C-1 | 39 | 39 | — | — |
| C-3 | — | — | — | 78 |
| D-2 | 12.3 | 12.3 | 12.3 | 12.3 |
| Solvesso 100 | 5.0 | 5.0 | 5.0 | 5.0 |
| Solvesso 150 | 5.0 | 5.0 | 5.0 | 5.0 |
| Recoating adhesiveness | o | o | x | x |
| Contact angle | 86 | 88 | 86 | 79 |
| Weathering resistance 60° gloss retention after 2 years exposure in Okinawa | 99 | 101 | 98 | 84 |

TABLE 10

| | | Comparative Example | |
|---|---|---|---|
| Composition | δsp | 25 *1 | 26 *2 |
| Fluorine-containing copolymer *3 | 9.8 | 80 | — |
| Fluorine-containing copolymer *3 | 9.8 | — | 50 |
| Acrylic copolymer *4 | 11.7 | 20 | 50 |
| Block isocyanate solution *5 | 11.9 | 17.1 | — |
| Polyisocyanate compound *6 | 10.3 | — | 16.1 |
| Xylene | — | 18 | 18 |
| Butyl acetate | — | 6 | 6 |
| Cellosolve acetate | — | 6 | 6 |
| Dibutyl tin dilaurate | — | 0.6 | 0.6 |
| Contact angle | — | 90 | 85 |
| Visual appearance | — | Poor | Poor |

*1: According to top clear coating composition No. 2 of JP-A-61-46283
*2: According to top clear coating composition No. 5 of JP-A-61-46283
*3: Lumiflon LF-200 by Asahi Glass K.K.
*4: Prepared in the same manner as in JP-A-61-46283
*5: Coronate 2725 by Nippon Polyurethane K.K.
*6: Coronate EH by Nippon Polyurethane K.K.

COMPARATIVE EXAMPLE 27

A coating composition having the composition shown in Table 11 was prepared and the performance thereof was evaluated in the same manner as mentioned above.

The results are shown in Table 11.

TABLE 11

| Composition | δsp | Comparative Example 27 |
|---|---|---|
| Fluorine-containing resin *1 | 9.8 | 20 |
| Polyisocyanate compound *2 | 11.0 | 14 |
| Acryl copolymer solution *3 | 10.3 | 80 |
| Aluminum paste *4 | — | 10 |
| Butyl acetate | — | 10 |
| Contact angle | — | 83 |
| Visual appearance | — | Poor |

*1: Lumiflon LF-200 by Asahi Glass K.K.
*2: Sumidule N-75 by Sumitomo Bayer Urethane Co.
*3: Prepared in the same manner as in Production Example 8 of JP-A-59-197471
*4: Aluminum paste 1700 NL by Toyo Aluminum K.K.

COMPARATIVE EXAMPLES 28 AND 29

Coating compositions having the compositions shown in Table 12 were prepared and the performance thereof were evaluated in the same manner as mentioned above.

The results are shown in Table 12.

TABLE 12

| Composition | δsp | Comparative Example 28 | Comparative Example 29 |
|---|---|---|---|
| Monomer blend A *1 | 10.8 | 300 | — |
| Monomer blend B *2 | 9.5 | — | 300 |
| Tert-butyl perbenzoate *3 | 10.1 | 6 | 6 |
| Siloxamediol A | 9.8 | 1326 | 660 |
| Contact angle | — | 80 | 78 |
| Visual appearance | — | Poor | Poor |

*1: Prepared according to Example 1 of GB 117102
*2: Prepared according to Example 2 of GB 117102
*3: Uvan 20N-60 by Mitsui Toatsu Co.

As described above, the following effects can be obtained by using the coating composition according to the present invention. That is, according to the present invention, through the layer separation phenomenon of two specific kinds of resins, a coating having an excellent appearance and deep tone of the upper clear layer and the lower pigment layer can be obtained, and the characteristics of the resin in the upper clear layer can be imparted as the surface characteristics of the coating in a small amount. Further, compared with the composition formed only with a copolymer resin and a curing agent, an excellent adhesiveness to the substrate, and an excellent economy with a superior weathering resistance can be obtained. Further, in a composition containing a pigment, by dispersing the pigment with an acrylic resin with a high sp value, for example, a fluorine resin with a low sp value can be floated to the upper layer, whereby a superior effect can be obtained such that the finished appearance is also improved.

We claim:

1. A coating composition comprising:
   (i) a mixture of copolymers comprising (a) 20% to 80% by weight, in terms of the resin solid content, of at least one copolymer selected from the group consisting of silicon-containing copolymers and fluorine-containing copolymer comprising 40 to 60 mol % of fluoroolefin, 45 to 5 mol % of cyclohexylvinyl ether, 15 to 5 mol % of alkylvinyl ether, and 0 to 30 mol % of other comonomers, and having an active hydrogen group and (b) 80% to 20% by weight, in terms of the resin solid content, of an acrylic copolymer resin having a solubility parameter greater by 0.7 to 1.5 than that of said copolymer (a) and having an active hydrogen group, and
   (ii) at least one alkyl etherated amino resin having a solubility parameter greater by 0.5 to 1.5 than that of said copolymer (a).

2. A composition as claimed in claim 1, wherein a weight mix ratio of said mixture of copolymers to the alkyl etherated amino resin is 55/45 to 95/5 in terms of a ratio of the solid content.

3. A coating composition comprising:
   (i) a mixture of copolymers comprising (a) 20% to 80% by weight, in terms of the resin solid content, of at least one copolymer selected from the group consisting of silicon-containing copolymers and fluorine-containing copolymer comprising 40 to 60 mol % of fluoroolefin, 45 to 5 mol % of cyclohexylvinyl ether, 15 to 5 mol % of alkylvinyl ether, and 0 to 30 mol % of other comonomers, and having hydroxyl groups and (b) 80% to 20% by weight, in terms of the resin solid content, of an acrylic copolymer resin having a solubility parameter greater by 0.7 to 1.5 than that of said copolymer (a) and having hydroxyl groups, and
   (ii) at least one isocyanate compound having a solubility parameter greater by 1.2 to 1.5 than that of said copolymer (a), wherein the weight mix ratio of the mixture of copolymers (i) to the isocyanate compound is 0.3 to 1.5, in terms of a molar ratio of isocyanate groups/hydroxyl groups.

4. A coating composition as claimed in claim 3, wherein said mixture of copolymers (i) further contains dispersed pigment.

* * * * *